3,455,967
SYNTHESIS OF AROMATIC EPOXIDES FROM BENZYLIC SULFONIUM SALTS
Melvin J. Hatch, Socorro, N. Mex., assignor to The Dow Chemical Company, Midland, Mich., a corporation of Delaware
No Drawing. Continuation-in-part of application Ser. No. 489,743, Sept. 23, 1965. This application Jan. 18, 1968, Ser. No. 698,736
Int. Cl. C07d 1/02
U.S. Cl. 260—348    11 Claims

ABSTRACT OF THE DISCLOSURE

Reaction of a benzylic sulfonium salt (1) with an aldehyde or ketone (2) in the presence of a strong aqueous base provides a new synthesis of aromatic epoxides (3), e.g.:

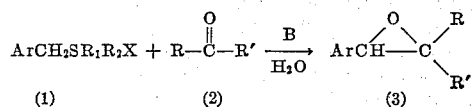

The aromatic epoxides, including styrene oxide, are useful as stabilizers and as reactants in preparing epoxy resins, antioxidants, etc.

---

This is a continuation-in-part of application Ser. No. 489,743, filed Sept. 23, 1965, by Melvin J. Hatch, now abandoned.

BACKGROUND

The formation of sulfonium ylides from certain sulfonium salts in a strongly basic, nonaqueous solution is known. For example, dimethylsulfonium methylide

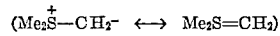

is formed by reaction of trimethylsulfonium iodide with methylsulfinylcarbanion in dimethylsulfoxide. Such sulfonium ylides can react in the non-aqueous solution with certain carbonyl compounds to form epoxides. [Johnson & LeCount, J. Am. Chem. Soc., 83, 417 (1961); Corey & Chaykovisky, ibid., 84, 3782 (1962); Franzen & Driessen, Tetrahedron Letters, 661 (1962), Ber., 96, 1881 (1964).] However a similar reaction in aqueous solution has not been described even though it would have numerous advantages for industrial practice.

STATEMENT OF THE INVENTION

It has now been discovered that benzylic sulfonium salts, which have a methylenesulfonium group $$(-CH_2S^+<)$$

activated by a phenyl, naphthyl or other aromatic group, condense in a strongly alkaline aqueous solution with aldehydes and ketones to form aromatic epoxides. More specifically a process has been discovered for preparing aromatic epoxides by reacting in aqueous solution: (A) a benzylic sulfonium salt of the formula:

$$ArCH_2SR_1R_2X \quad (1)$$

where Ar is an aromatic group, $R_1$ and $R_2$ are individually a $C_1$–$C_4$ alkyl or hydroxyalkyl group, and X is a counteranion; (B) an aldehyde or ketone of the formula:

where R and R' are individually H or an organic group; and (C) a water-soluble base having a $pK_a$ greater than 11.0 to form (D) an aromatic epoxide of the formula:

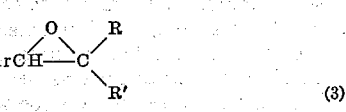

where Ar is the aromatic group of the sulfonium salt and R and R' are the substituent groups of the aldehyde or ketone.

In a preferred embodiment the benzylic sulfonium salt and aldehyde or ketone are reacted in a heterogeneous mixture of water and a water-insoluble organic extractant to remove the epoxide from the aqueous phase as it forms. Epoxide yields are high. For example, an 86% yield of styrene oxide is obtained by reaction of benzyldimethylsulfonium chloride, formaldehyde and sodium hydroxide in aqueous solution with toluene added as an extractant.

A wide variety of epoxides can be synthesized by this process particularly since benzylic sulfonium salts can be prepared from such halomethylaromatic compounds and polymers as benzyl bromide, p-vinylbenzyl chloride, chloromethylnaphthalene, chloromethylpolystyrene, chloromethylpoly(methylenediphenyl)ether, etc. It is particularly useful in the preparation of aromatic epoxides not readily obtained by conventional epoxidation of olefinic groups and for preparing polyepoxides from the sulfonium salts of polychloromethylated dibenzyl, diphenylmethane, diphenyl ether, diphenyl sulfide, diphenyl sulfone, polystyrene, etc.

The aromatic monoepoxides are useful as scavengers for HCl or HBr and as stabilizers for chlorinated solvents (Dial U.S. Patent 3,025,331). The utility of these epoxides in the synthesis of phosphorous containing plasticizers, lubricants and softening agents (Kolka U.S. Patent 2,866,808) is just one example of their wide synthetic utility (Kirk-Othmer, "Encyclopedia of Chemical Technology," 2nd ed., vol. 8, Interscience, New York, 1965, p. 2388; M. S. Malinovskii "Epoxides and Their Derivatives," 1965). In addition the aromatic polyepoxides have utility in the manufacture of epoxy resins and other plastic materials (Burk et al. U.S. Patents 2,768,182 and 2,807,599; Phillips et al. U.S. Patents 2,912,389, 2,917,493, and 2,918,444). Useful diphenyl ether bisepoxides as described by Neville et al. (J. Appl. Polym. Sci., 11, 2029 (1967)) can be prepared by this process.

REACTANTS

Essential is a benzylic sulfonium salt of the formula $$ArCH_2SR_1R_2X \quad (1)$$

where Ar is an aromatic group, $R_1$ and $R_2$ are individually a $C_1$–$C_4$ alkyl or hydroxyalkyl group, and X is a counteranion. The aromatic group can be a phenyl, naphthyl, or diphenyl ether group, or an aromatic group of a polymer. Furthermore the aromatic group can contain alkyl, alkoxyl, halo, and other substituent groups which do not interfere with the subsequent epoxidation.

Typical benzylic sulfonium salts include benzyldimethylsulfonium chloride, m-chlorobenzyldimethylsulfonium chloride, p-ethylbenzyldi(2-hydroxyethyl)sulfonium chloride, and p-vinylbenzyldimethylsulfonium chloride. Polysulfonium salts such as m-xylylenedimethylsulfonium chloride and the sulfonium salts prepared from polyhalomethylated aromatic compounds or polymers such as described by Hatch and McMaster in U.S. Patent 3,078,259 are also suitable. The process is particularly useful with benzylic sulfonium salts of the formula:

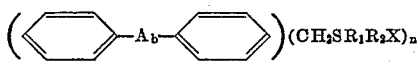

wherein A is a $C_1$–$C_3$ alkylidene group, —O—, —S—, or —$SO_2$—; $b$ is 0 or 1; $R_1$, $R_2$, and X are as defined above: and $n$ is 1–4.

Such benzylic sulfonium salts can be prepared, for example, from a benzylic halide obtained by chloromethylation of an aromatic hydrocarbon or a polymeric chloromethyldiphenyl ether such as described by Geyer et al. U.S. Patent 3,316,186 by reaction with an organic sulfide, e.g.:

$$ArCH_2X + R_1R_2S \rightarrow ArCH_2SR_1R_2X \quad (Eq. 2)$$

where Ar, $R_1$ and $R_2$ are organic groups defined above and X is chlorine, bromine or iodine. In this synthesis it is advantageous to use a $C_1$–$C_4$ alkyl or hydroxyalkyl sulfide such as dimethyl sulfide, diethyl sulfide, methyl 2-hydroxyethyl sulfide, bis(2-hydroxyethyl)sulfide and di-n-butyl sulfide. Such sulfides are both available and conveniently recovered after epoxidation for reuse.

Normally the sulfonium salts have a halide counteranion (X). But if desired, the salt can be converted into another anionic form such as the nitrate, sulfate, carbonate, acetate or tosylate by standard ion exchange techniques.

Many aldehydes and ketones can be used in the present process. Formaldehyde, benzaldehyde, acetaldehyde, furfural, p-terephthaldehyde, acetone, acetophenone and other $C_1$–$C_{20}$ aldehydes and ketones are typical. The aldehyde or ketone can contain more than one reactive carbonyl group as well as alkyl, halo, hydroxyl, alkoxyl and similar substituent groups which do not interfere with the epoxidation. But since the condensation occurs in a strongly basic aqueous solution, the aldehyde or ketone must be sufficiently stable in the alkaline solution to permit the desired reaction with the sulfonium salt. A very reactive aldehyde such as glyoxal may fail to give the desired epoxide because of more rapid competing reactions.

Particularly suitable are carbonyl compounds of the formula

wherein R is H or a $C_1$–$C_6$ alkyl group and R′ is R, an aryl, alkaryl or 2-furanyl group. Aldehydes free of α-hydrogen are preferred.

The process also requires a strong water-soluble base. Sodium hydroxide is preferred. But other alkali or alkaline earth oxides or hydroxides having a water solubility of at least 0.1 weight percent and a $pK_a$ in aqueous solution of at least 11.0 can be used.

REACTION CONDITIONS

The epoxidation reaction:

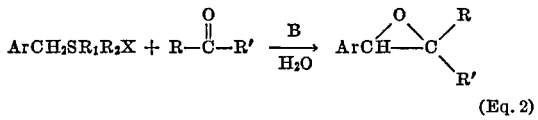

occurs in an aqueous medium and requires at least 1 mole of base per mole of sulfonium salt. Generally use of 1.2–5.0 moles of base per mole of sulfonium salt is desirable. Also for maximum yield, a ratio of 1.1–3.0 moles of aldehyde or ketone per mole of sulfonium salt is preferred.

Water is a particularly effective medium. It is a good solvent for many sulfonium salts. Indeed they are often prepared from a benzylic halide in aqueous solution and such solutions can generally be used in the present process without isolation of the sulfonium salt. At times addition of a moderate amount of a water-soluble $C_1$–$C_6$ alcohol, such as methanol, ethylene glycol, 2-ethoxy-ethanol, or 1,4-butanediol, is advantageous to increase the mutual solubility of the reactants.

In the preferred process, a water-insoluble organic extractant is added to remove the epoxide from the aqueous phase as it is formed thereby minimizing hydrolysis and other side reactions. Particularly suitable as extractants are aliphatic and aromatic hydrocarbons such as hexane, heptane, cyclohexane, benzene, toluene, and ethylbenzene as well as petroleum refining fractions like kerosene and naphtha. $C_1$–$C_4$ chlorinated hydrocarbons which are stable to aqueous alkali under the reaction conditions also are effective extractants. Typical are methylene chloride, carbon tetrachloride, methylchloroform, 1,2-dichloroethane and 1,2-dichloropropane. To facilitate recovery of the extracted epoxide, an extractant with a boiling point between 30° and 130° C. is often preferred.

Optimum conditions for a given epoxidation will of course depend upon the reactivity and stability of the reactants and product as well as the reaction concentrations and temperature. Usually the reaction can be carried out at about 20°–100° C., preferably at 30°–80° C. Depending upon the particular reactants, the reaction time can vary from a few minutes to several days. But normally a substantial conversion of the sulfonium salt is achieved in 0.1–2 hours at 30°–80° C. A moderate superatmospheric pressure can be used if desired to maintain a liquid phase and minimize the loss of volatile materials.

The scope of the present useful epoxidation process involving reaction of a benzyl sulfonium salt and an aldehyde or ketone in an aqueous alkaline solution is broad. Yet it is subject to recognized structural factors as well as to specific reaction conditions. For example, increasing the acidity of the benzyl sulfonium salt or decreasing the rate of the competing base-catalyzed reactions of the carbonyl reactant will favor the epoxidation. However, within the general scope of the disclosed process, optimum reaction conditions for a given epoxidation can be determined in a routine manner.

To illustrate further the present invention the following examples are given. Unless otherwise specified, all parts and percentages are by weight.

Example 1.—Styrene oxide (A) A mixture of 683 parts (5.4 moles) benzyl chloride, 777 parts (12.5 moles) dimethyl sulfide and 900 parts water was stirred at reflux for 2 days. Then the aqueous phase was recovered and purged with nitrogen to remove dissolved dimethyl sulfide. Analysis of the aqueous phase for ionic chloride and total acidity indicated a 93 percent conversion to benzyldimethylsulfonium chloride with less than 0.2 percent hydrolysis.

(B) To 59.6 parts of the above aqueous solution containing 167 meq. of the benxylsulfonium chorlide was added 37.5 parts (465 meq.) of 30% aqueous formaldehyde and 65 parts of ethylbenzene. The heterogeneous mixture was stirred and heated to 55° C. Then 56 parts (700 meq.) of 50% caustic was added rapidly in one portion. A vigorous reaction occurred with a temperature rise to 82° C. After 2 minutes, ice was added to quench the reaction and the organic phase separated. Analysis of the organic phase for total epoxide by the pyridine hydrochloride method [Lee and Neville "Epoxy Resins," McGraw-Hill, N.Y. 1957, p. 21] indicated an 87% yield of styrene oxide based on the initial benzylsulfonium chloride. Distillation of the organic phase gave 15.0 parts of styrene oxide, B.P. 71–3°/10 mm. Hg, with a purity of 94% based on epoxide analysis. The total yield of isolated styrene oxide was 71%.

(C) Table 1 summarizes data from a number of runs similar to Example 1(B) using 1.2–2.0 N aqueous benzyldimethylsulfonium chloride solutions and several ratios of formaldehyde and caustic based on the sulfonium salt.

TABLE I.—SYNTHESIS OF STYRENE OXIDE

| Run | Mole ratio [1] | | | T., °C. | | Time | Epoxide yield, percent |
|---|---|---|---|---|---|---|---|
| | HCHO/S+ | NaOH/S+ | Extractant | Initial | Max. | | |
| 1C-1 | 2.8 | 1.42 | Hexane | 22 | 30 | 3 days | 14 |
| 1C-2 | 2.8 | 1.42 | Benzene | 40 | 67 | 1 hr | 48 |
| 1C-3 | 2.8 | 1.42 | do | 40 | 67 | 6 min | 41 |
| 1C-4 | 2.8 | 1.42 | Toluene | 80 | 88 | 5 min | 48 |
| 1C-5 | 2.8 | 4.25 | do | 55 | 84 | 2 min | 86 |
| 1C-6 | 2.8 | 4.25 | do | 55 | 84 | 10 min | 84 |
| 1C-7 | 1.4 | 4.25 | do | 55 | 84 | 2 min | 70 |
| 1C-8 | 1.4 | 8.0 | do | 55 | 84 | 2 min | 34 |

[1] Based on initial concentration of benzyldimethylsulfonium chloride.

(D) Table 2 presents data from typical styrene oxide runs made using the general procedure of Example 1(B) and several different water-insoluble extractants. An aqueous solution 1.28 N in benzyldimethylsulfonium chloride, 3.6 N in formaldehyde and 5.4 N in caustic was used in these runs with a reaction time of 2 minutes. For comparison a similar run was made without an extractant during the reaction. The yield of styrene oxide was determined by extraction with toluene after the reaction was quenched with ice.

TABLE II.—STYRENE OXIDE EXTRACTANTS

| Run | Extractant | T., °C. | | Epoxide yield, percent |
|---|---|---|---|---|
| | | Initial | Max. | |
| 1D-1 | None | 80 | 88 | 37 |
| 1D-2 | Heptane | 75 | 84 | 66 |
| 1D-3 | Benzene | 27 | 60 | 61 |
| 1D-4 | Toluene | 55 | 84 | 86 |
| 1D-5 | Ethylbenzene | 55 | 87 | 88 |
| 1D-6 | Methylchloroform | 55 | 74 | 67 |

Example 2.—Trans-stilbene oxide (A) To 1000 parts of 3.4 N aqueous benzyldimethylsulfonium chloride, 727 parts (6.86 mole) benzaldehyde, and 1300 parts of toluene heated at 70° C. was added 480 parts (5.6 mole) of 50% caustic. The mixture was stirred at reflux (ca. 80° C.) for 30 minutes and then cooled. The organic phase was separated and combined with the organic phases from 2 other runs made under similar conditions. The total toluene extract (10.800 parts) contained by epoxide analysis a minimum 75% yield of trans-stilbene oxide.

The combined organic phase was stripped of solvent and the trans-stilbene oxide separated from excess benzaldehyde by crystallization. Recovered 1734 parts of crystalline product, M.P. 68–9° C. (57% yield). The mother liquor by epoxide analysis contained another 760–900 parts of stilbene oxide for a total yield of 82–87%.

(B) To 100 parts of 3.2 N aqueous benzylbis(2-hydroxyethyl)sulfonium chloride, 36 parts (0.34 mole) benzaldehyde, 100 parts of methonal and 100 parts of water heated at 45° C. was added 35 parts of 1.2 N sodium hydroxide. The mixture was refluxed at 75° C. for about 25 minutes, cooled, and extracted with methylene chloride. From the extract was recovered 12 parts (19% yield) of crystalline trans-stilbene oxide.

Trans-silbene oxide is useful in the synthesis of phosphoric acid ester plasticizers (Kolka U.S. Patent 2,866,808) and in scientific research (Curtin & Kellom, J. Am. Chem. Soc., 75, 6011 (1953)).

Example 3.—Other epoxides from benzylsulfonium salts (A) Following the general procedure of Example 2(A), benzyldimethylsulfonium chloride was condensed with furfural in the presence of toluene and aqueous caustic at 50° C. The liquid oil obtained on concentration of the toluene extract contained about 10% unreacted furfural. Its NMR spectrum was consistent with that expected for 2-(epoxyphenethyl)furane, assuming a mixture of erythro and threo isomers, and indicated a minimum purity of 90%. Based on the NMR analysis a 73% yield of epoxide was obtained. The pyridine-HCl epoxide analysis of the oil gave low results but confirmed a minimum yield of 47% calculated as 2-(epoxyphenethyl)furane.

(B) In a similar manner condensation of benzyl-dimethylsulfonium chloride and p-terephthaldehyde in aqueous caustic gave a 40% yield of a crystalline solid, identified as an isomer of 1,4-bis-(2-phenyl-1,2-epoxyethyl)benzene, M.P. about 200° C.

(C) A similar reaction with acetaldehyde was unsuccessful. However, by the inverse addition of a solution of acetaldehyde in benzene in 10 minutes to an aqueous mixture of benzyldimethylsulfonium chloride and caustic at 60° C. the competing acetaldehyde reactions were minimized. The mixture was refluxed for 20 minutes and then cooled. Analysis of the aqueous phase indicated consumption of 76% of the theoretical amount of NaOH. The organic phase contained by epoxide analysis about a 50% yield of 1,2-epoxypropylbenzene. Distillation gave a liquid product, B.P. 40–44° C./0.5 mm. Hg, which by epoxide, infrared and NMR analysis was identified as a mixture of erythro- and threo-1,2-epoxypropylbenzene with a minimum purity of 90%. The isolated yield was 50%.

A similar inverse addition technique gave a low yield (ca. 16%) of the desired epoxide from acrolein, but no epoxide could be detected from reaction with glyoxal.

(D) To illustrate reaction with ketones, a mixture of 0.30 mole of 3 N aqueous benzyldimethylsulfonium chloride, 0.80 mole acetone, and an equal volume of n-hexane was prepared at room temperature. Then 0.47 mole aqueous NaOH was added and the mixture refluxed for an hour. The organic phase was separated and concentrated to give a 60% yield of crude 1,2-epoxy-2-methylpropylbenzene. The structure of the product and a minimum purity of 90% were confirmed by infrared and NMR analysis.

A similar reaction with acetophenone gave a 50–60% yield of an epoxide identified as a mixture of erythro- and threo-α-methylstilbene oxide.

Example 4.—Substituted aromatic epoxides

Using the general process described in Example 1(B), substituted aromatic epoxides have been prepared from a variety of substituted benzyl and naphthylmethylenesulfonium salts. Typical results are given in Table 3. The yields are based on product isolated from the toluene or hexane extractant.

TABLE III.—SUBSTITUTED AROMATIC EPOXIDES

| Run | Sulfonium salt | Aldehyde | T, °C. | Epoxide yield, percent |
|---|---|---|---|---|
| 4-1 | $CH_3$-⟨phenyl⟩-$CH_2S(CH_3)_2Cl$ | ⟨phenyl⟩-CHO | 50-75 | [1] 74 |
| 4-2 | $CH_2=CH$-⟨phenyl⟩-$CH_2S(CH_3)_2Cl$ | HCHO | 45-60 | [2] 57 |
| 4-3 | ⟨naphthyl with $CH_2S(CH_3)_2Cl$⟩-$CH_3$ | HCHO | 45-60 | 23 |

[1] B.P. 123°-129°/0.3 mm., partially crystallized on standing.
[2] 93% pure by epoxide and vinyl unsaturation analyses.
[3] Based on spectral and epoxide analysis.

Example 5.—Bisepoxides

The process can be used to prepare aromatic epoxides containing more than one epoxy group per molecule by reaction of bis(halomethyl)aromatic compounds with dimethyl sulfide and then with formaldehyde and caustic.

(A) A quantitative yield of m-(phenylenedimethylene) dimethylsulfonium bromide was obtained from the reaction of α,α'-dibromo-m-xylene with an excess of dimethyl sulfide in water for 4 days. To the aqueous solution was added excess formaldehyde and toluene. After heating to 55° C., about 1.05 mole of NaOH was added rapidly. The organic phase recovered after stirring at 70-75° C. for 15 minutes contained a 70% yield of 1,3-bis(epoxyethyl)benzene. When mixed with 5 parts diethylenetriamine at room temperature, a hard, tough thermoset billet was obtained.

(B) In a similar manner an α,α'-dichloro-$C_9$-$C_{10}$-polymethylbenzene, containing 30–32% reactive chlorine primarily as m-chloromethyl groups, was converted into a bis(dimethylsulfonium)salt in about 85% yield. Reaction with formaldehyde and NaOH at 50–75° C. in the presence of toluene gave a 33–37% yield of the corresponding bisepoxide.

(C) To demonstrate the amine curing of these aromatic bisepoxides, a mixture of 1 part of 2,4-diepoxyethyltoluene (E.W.∼100) was mixed with 1 part diethylenetriamine (E.W.=20) and heated at 100° C. for 0.5 hr. giving a tough crosslinked amber solid resin having a melting point above 200° C.

Similar results are obtained with bis(chloromethyl) naphthalene, 4,4'-bis(chloromethyl)diphenyl ether, etc.

Example 6.—Diphenyl ether epoxides

The availability of a series of chloromethyldiphenyl ethers containing an average of from 1–4 chloromethyl groups per molecule prompted preparation of the corresponding dimethylsulfonium salts for use in the present epoxidation process. Included were the dimethylsulfonium salts of 4,4'-bis(chloromethyldiphenyl)ether, of CMDPE-25, a chloromethylation mixture containing 25.2 wt. percent Cl (about 1.85 $ClCH_2$—/molecule), and of CMDPE-34, a mixture containing 34.5 wt. percent Cl (about 3.13 $ClCH_2$—/molecule).

(A) A mixture of 1.24 moles of the dimethylsulfonium chloride from CMDPE-34, 3.72 moles of aqueous formaldehyde, water and toluene was heated to 50° C. and about 5.3 moles of aqueous NaOH added in 2 portions. After another 10 minutes, the toluene phase was separated, dried, and concentrated in vacuo at 40–55° C. A yellow viscous oil was obtained in 68% yield calculated as the theoretical polyepoxide. By the pyridine HCl epoxide analysis, the oil had a minimum purity of 68%. It had a molecular weight of 350 based on an ebullioscopic determination in methyl ethyl ketone, an equivalent weight of 169 based on the epoxide analysis. By varying reactant ratios, diphenyl ether epoxides were prepared with equivalent weights ranging from about 130–300.

A mixture of 450 parts of a diphenyl ether epoxide (E.W.=136) and 147.5 parts (0.9 equivalent) of p,p'-methylenedianiline was poured into a mold preheated to 93° C. and then cured for 2 hrs. at 93° C. and 4.5 hrs. at 204° C. Samples of the resulting resin had a flexural strength of 10,340 p.s.i. The thermal stability of this resin was demonstrated by the relatively small decrease in flexural strength to about 8830 p.s.i. after 295 hrs. at about 230° C.

Other thermoset resins have been prepared from diphenyl ether epoxides and other conventional epoxide resin curing agents including nadic methyl anhydride, diaminodiphenyl sulfone, triethylenetetramine, bisphenol A, etc.

(B) Similarly from CMDPE-25 was obtained a liquid epoxide having an ebullioscopic molecular weight of 270 and an epoxide equivalent weight of 201. After several days the liquid partially crystallized. By recrystallization from methanol, the solid 4,4'-bis(epoxyethyl)diphenyl ether was obtained.

Calcd. for $C_{16}H_{14}O_3$: C, 75.55; H, 5.54. Found: C, 75.7; H, 5.54.

A similar crystalline epoxide was also prepared from the dimethylsulfonium salt of 4,4'-bis(chloromethyl)diphenyl ether.

(C) Another portion of the dimethylsulfonium salt of CMDPE-34 in aqueous solution was condensed with an equimolar amount of furfural in the presence of NaOH and toluene at 50–75° C. From the organic phase was recovered an 82% yield of weight of a light brown amorphous solid which had an epoxide equivalent weight of 246 by the pyridine HCl method. Its infrared spectrum was consistent with the expected structure.

(D) From the dimethylsulfonium salt of CMDPE-34 and benzaldehyde was obtained a yellow, brittle and transparent solid which melted below 100° C. in a 65% yield by weight. The purity based on epoxide analysis was about 83%. The epoxide cured slowly when heated with triethylenetetramine into a hard cross-linked resin.

In a similar manner other polyepoxides can be prepared from the sulfonium salts of chloromethylated diphenylmethane, diphenylsulfone and other reactive aromatic compounds which can be chloromethylated to introduce from 1–4 chloromethyl groups per aromatic molecule.

Example 7.—Epoxides from aromatic polymers

To 100 parts of an aqueous solution containing 21.5 parts of the dimethylsulfonium salt (87 meq. S+) of a soluble chloromethyldiphenyl ether polymer having an average degree of polymerization of about 10 was added 20 parts (248 meq.) of 30% formaldehyde and 32 parts toluene. The mixture was heated to 40° C. and 24 parts (300 meq.) of 50% NaOH added. After stirring at reflux for 40 minutes, the mixture was cooled and the organic layer separated. Analysis by the pyridine·HCl method indicated an epoxy content of about 0.6 meq./g. of diphenyl ether polymer.

I claim:
1. In a process for preparing aromatic epoxides from benzylic sulfonium salts, the improvement which comprises: reacting in aqueous solution:
(a) a benzylic sulfonium salt of the formula:

$$ArCH_2SR_1R_2X$$

where Ar is an aromatic group, $R_1$ and $R_2$ are individually a $C_1$–$C_4$ alkyl or hydroxyalkyl group, and X is a counteranion;
(b) an aldehyde or ketone of the formula:

$$R-\overset{O}{\underset{\|}{C}}-R'$$

where R is H or a $C_1$–$C_4$ alkyl group, and R' is R or an aryl, alkaryl, or 2-furanyl group; and
(c) an alkali or alkaline earth metal base having a water solubility of at least 0.1 weight percent and a $pK_a$ in aqueous solution of at least 11.0 to form
(d) an aromatic epoxide of the formula:

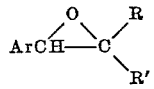

where Ar is the aromatic group of the sulfonium salt, and R and R' are the substituent groups of the aldehyde or ketone.

2. The process of claim 1 where a water-insoluble organic extractant is added to the reaction mixture to remove the epoxide from the aqueous phase as it is formed.
3. The process of claim 2 where the extractant is an aliphatic hydrocarbon, an aromatic hydrocarbon, or a $C_1$–$C_4$ chlorinated hydrocarbon, said extractant having a boiling point between 30°–130° C.
4. The process of claim 1 where the base is sodium hydroxide.
5. The process of claim 1 where the sulfonium salt (a) is a polysulfonium salt.
6. The process of claim 5 where the aromatic group of polysulfonium salt is a diphenyl ether group.
7. The process of claim 1 where the sulfonium salt (a) has the formula:

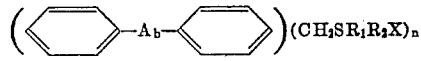

wherein
A is a $C_1$–$C_3$ alkylidene group, —O—, —S—, or —$SO_2$—;
B is 0 or 1;
$R_1$ and $R_2$ are individually a $C_1$–$C_4$ alkyl or hydroxyalkyl group;
X is a counteranion; and
n is 1–4.
8. The process of claim 1 where (b) is an aldehyde free of α-hydrogen.
9. The process of claim 8 where the aldehyde is formaldehyde.
10. The process of claim 1 where the aromatic epoxide is a polyepoxide.
11. The process of claim 1 where dimethylbenzylsulfonium chloride is reacted with formaldehyde in the presence of aqueous sodium hydroxide and toluene at about 20°–100° C. to yield styrene oxide.

References Cited

Franzen et al.: Tetrahedron Letters, 661 (1962).
Franzen et al.: Ber., 96, 1881 (1964).

NORMA S. MILESTONE, Primary Examiner

U.S. Cl. X.R.

260—2, 63, 67, 347.8